2,981,979

FABRICATION OF POROUS ARTICLES FROM POLYETHYLENE

Charles L. Seefluth, Bartlesville, Okla., assignor to Phillips Petroleum Company, a corporation of Delaware No Drawing. Filed Sept. 17, 1959, Ser. No. 840,501

3 Claims. (Cl. 18—48)

This invention relates to a process for the fabrication of porous articles from polyethylene.

The inertness of polyethylene has suggested its use in the production of filter elements. It will not contaminate the material filtered and can be used with corrosive gases and liquids, for example, nitric acid, carbonic acid, sulfuric acid, sodium hydroxide, etc.

The followng are objects of this invention.

An object of this invention is to provide a method of producing filters from polyethylene. A further object of the invention is to provide a method for the production of filters of polyethylene wherein the pore size of the filter can be controlled.

Other objects and advantages of my invention will be apparent to one skilled in the art upon reading this specification.

Broadly, the invention resides in the method of making a porous article comprising mixing polyethylene powder having a particle size in the range of 50 to 80 mesh with a second powder having a particle size of less than 200 mesh consisting of talc and mixtures of talc and a metal stearate, said mixtures containing up to 50 percent by weight of said metal stearate, the amount of said second powder being 18 to 25 percent by weight of the mixture of polyethylene and said second powder, forming a mixture of polyethylene and second powder to the desired shape, and sintering the shaped article at a temperature of 300 to 350° F. for 10 to 30 minutes. By this process the porosity of the article can be controlled within several microns and the average porosity can be varied from less than 5 to about 50 microns. Lower porosity is obtained by using the higher mesh polyethylene. The porosity of the filter is more uniform when the polyethylene has a uniform particle size and the range of 60 to 70 mesh is preferred. With most polyethylene plastics presently available, the process of my invention is necessary in order to provide a porous article. If no second powder is used, the heating results in melting of the polyethylene, at least on the surface. Furthermore, the polyethylene tends to form into agglomerated masses throughout the article and this leaves undesirable voids. The use of talc provides a material which transmits heat into the interior of the article and also keeps the particles of polyethylene from completely fusing during sintering. As can be seen from the broad description of the invention, a metal stearate, such as zinc stearate, can be used with the talc. This provides a method for increasing the porosity of the filter because the metal stearate can be easily removed by acid washing. Suitable acids include the inorganic acids, such as sulfuric acid and phosphoric acid. It is important to note, however, that zinc stearate in the absence of talc does not eliminate cracks in the filter.

The filter can be made using any forming operation normally used with plastics of the type of polyethylene and the particular mold does not constitute a feature of my invention. To prepare the article in the mold, considerable pressure is necessary and I generally use a pressure in the range of 150 to 30,000 pounds per square inch at ambient temperature. Pressures in this range produce an article which can be handled prior to sintering. Sintering is carried out by treating the article at a temperature in the range of 300 to 350° F. for 10 to 30 minutes. The article should be contained, such as in a paper form, during sintering. Any material can be used which has a heat conductivity approximately the same as the polyethylene. The best conductivity of the polyethylene used in the runs reported herein is 0.0011 calorie/square centimeter/second/° C./centimeter.

In the production of a filter, the polyethylene is prepared in the desired size by grinding in a micropulverizer and then grading to size. The powdered polyethylene is then mixed with the talc and, if used, the metal stearate. This mixing can be easily done by pouring the mixture back and forth between containers or with other conventional mixing apparatus.

I believe that my method is applicable to the production of filters from all of the various types of polyethylene now commercially available, these including the high density type produced by the method of Hogan et al., Patent No. 2,825,721, granted March 4, 1958; to the older high pressure polyethylene; and to polyethylene produced in the presence of organometal catalysts. I believe the invention will find its greatest applicability in forming filters from polyethylene which has a melt index (ASTM D1238–52T) in the range of 1 to 50.

For the examples ethylene was polymerized in a continuous process in the presence of a cyclohexane diluent and finely subdivided chromium oxide catalyst comprising 2.5 weight percent chromium oxide, containing 2.2 weight percent chromium, supported on silica-alumina (90/10). The catalyst was prepared by impregnating silica-alumina with chromium trioxide solution followed by drying and activation in air up to 950° F. for several hours. The followng conditions were used in the polymerization of ethylene:

| | |
|---|---|
| Temperature, ° F | 322 |
| Pressure, p.s.i.g | 420 |
| Catalyst concentration in reactor, wt. percent | 0.07 |
| Polymer concentration in reactor, wt. percent | 8 |
| Cyclohexane feed rate, lbs./hr | 200 |
| Ethylene feed rate lbs./hr | 30 |
| Residence time, hrs | 1.72 |
| Physical properties were: | |
| Melt index[1] | 5 |
| Density, gm./cc. room temp | 0.961 |
| Melting point, ° F.[2] | 252 |
| Stiffness, p.s.i | 153,000 |

[1] ASTM D1238–52T.
[2] Carried out by melting a sample of the polymer, inserting a thermocouple into the molten polymer and allowing the polymer to cool slowly. The temperature is recorded and is plotted on a chart versus time. The crystalline freeze point (melting point) is the first plateau in the time and temperature curve.

The following examples illustrate a particular filter made using the process of this invention.

Example 1

Polyethylene particles having a particle size of approximately 60 mesh prepared as above were mixed with ground talc having a particle size of less than 200 mesh were mixed in amounts to give 20 percent by weight of talc in the product. This mixture was formed to provide a cylinder three-quarter inch outside diameter by 13/32 inch inside diameter and 3¼ inches long having a cone closure at one end. The filter was formed by pressing in a mold at about 200 p.s.i. It was removed from the mold, wrapped in 20 white sulfite paper and sintered by immersing it in hot glycerine at 350° F. for 20 minutes. This produced the desired filter which will remove particles larger than 20 microns, pass 10 gallons of gasoline per hour at 0.3 inch mercury and which performed suitably, picking up gasoline in a gasoline tank to within ½ inch of the tank bottom. The filter can be easily cleaned by back washing.

Example II

A larger filter 2 inches outside diameter by 1 inch inside diameter by 10 inches long was formed of the same mixture as that of Example I. To maintain the shape it was heated at a slower rate, the temperature being raised 10° F. every half hour from 260° F. to 300° F. over a total period of 3 hours. This filter performed satisfactorily.

With larger porous articles, slow cooling is generally preferred in order to prevent excessive stresses in the product. Such slow cooling can be obtained by placing the filter in a 200° F. oven for 15 minutes after sintering at the temperature above 300° F.

Example III

The process of Example I was repeated using, in place of the talc, the mixture of talc and zinc stearate, each of these materials constituting half of the weight of the material added to the polyethylene. The zinc stearate was subsequently washed from the filter by contacting with concentrated phosphoric acid.

As many possible embodiments can be made of this invention without departing from the scope thereof, it is to be understood that all matter herein set forth is to be interpreted as illustrative and not as unduly limiting the invention.

I claim:

1. A method of making a porous article from polyethylene comprising mixing polyethylene powder having a particle size in the range of 50 to 80 mesh with talc having a particle size of less than 200 mesh, the amount of said talc being 18 to 25 percent by weight of the mixture of polyethylene and talc, pressing the mixture to the desired form using a pressure in the range of 150 to 30,000 p.s.i., and sintering the pressed article at a temperature of 300 to 350° F. for 10 to 30 minutes.

2. A method of making a porous article from polyethylene comprising mixing polyethylene powder having a particle size in the range of 50 to 80 mesh with a mixture of talc and zinc stearate each having a particle size of less than 200 mesh, said talc being present in an amount of at least 50 percent by weight of the mixture of talc and zinc stearate, the amount of said talc and zinc stearate being 18 to 25 percent by weight of the mixture of polyethylene, talc, and zinc stearate, pressing the mixture to the desired form using a pressure in the range of 150 to 30,000 p.s.i., sintering the pressed article at a temperature of 300 to 350° F. for 10 to 30 minutes, and washing zinc stearate from the sintered article.

3. A method of making a porous article from polyethylene comprising mixing polyethylene powder having a particle size in the range of 50 to 80 mesh with a mixture of talc and metal stearate each having a particle size of less than 200 mesh, said talc being present in an amount of at least 50 percent by weight of the mixture of talc and metal stearate, the amount of said talc and metal stearate being 18 to 25 percent by weight of the mixture of polyethylene, talc, and metal stearate, pressing the mixture to the desired form using a pressure in the range of 150 to 30,000 p.s.i., sintering the pressed article at a temperature of 300 to 350° F. for 10 to 30 minutes, and washing metal stearate from the sintered article.

References Cited in the file of this patent

FOREIGN PATENTS

| | | |
|---|---|---|
| 777,187 | Great Britain | June 19, 1957 |
| 814,320 | Great Britain | June 3, 1959 |